UNITED STATES PATENT OFFICE.

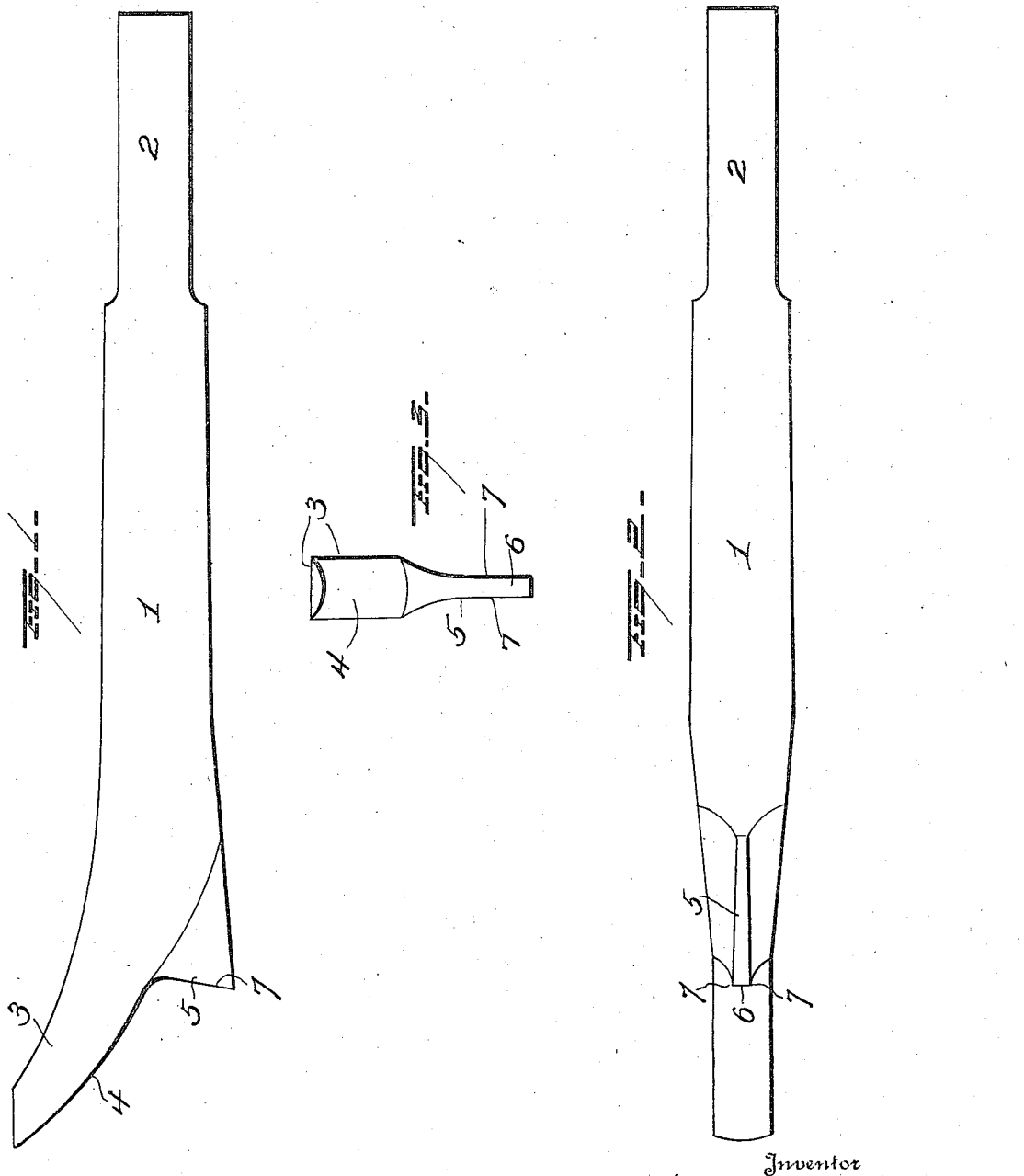

WILLIAM P. CARROLL, OF HORTON, KANSAS.

METAL-WORKING TOOL.

1,418,125.	Specification of Letters Patent.	Patented May 30, 1922.

Application filed August 26, 1921. Serial No. 495,474.

*To all whom it may concern:*

Be it known that I, WILLIAM P. CARROLL, a citizen of the United States, and a resident of Horton, in the county of Brown and State of Kansas, have invented certain new and useful Improvements in Metal-Working Tools; and I do hereby declare the following to be a full, clear, and exact description of the invention, such as will enable others skilled in the art to which it appertains to make and use the same.

This invention relates to improvements in metal working tools, and more particularly to such as are known in the art as "rippers," one object of the invention being to provide a "ripper" adaptable for use in a pneumatic motor, such as a pneumatic hammer, and to so construct the tool that its cutting member will not slip through the sheets or between sheets of steel to such an extent as to become stuck during the cutting operation.

A further object is to provide a metal working tool which shall be useful to great advantage in preparing sheets or patches to be welded by electric or acetylene welding methods, in the event that the space between the sheets to be welded together is not wide enough to properly permit the welding alloy to pass from face to face thereof or where the space between a patch and the wall of an opening in the sheet in which the patch is to be located is irregular and prohibitively narrow at certain points properly to receive the welding alloy.

A further object is to provide a metal working tool for use with a pneumatic hammer motor which will operate effectually to cut metal having a smooth or an irregular surface and to be readily operable to cut in straight or curved lines.

With these and other objects in view, the invention consists in certain novel features of construction and combinations of parts as hereinafter set forth and pointed out in the claims.

In the accompanying drawings; Figure 1 is a view in side elevation of a tool embodying my invention; Figure 2 is a bottom plan view, and Figure 3 is an end view.

The tool may be made of steel, having a body portion in the form of a bar 1 provided at its rear end with a shank 2 to be secured in the tool holder of a pneumatic hammer motor. A finger 3 projects upwardly and forwardly from the forward end of the bar or body portion 1 and may be curved so as to provide an under face 4 which is curved from end to end of said finger and the under face of the latter may also be curved transversely.

The bar or body member 1 is provided at its forward end near the base of the finger 3 with an integral cutting member 5, the bottom edge of which is, in effect, a continuation of the bottom edge of the bar or body member 1. The cutting member 5 may be made somewhat tapering near its juncture with the bar or body member 1 as shown in Figure 3 and it may be made tapering longitudinally from its forward to its rear end. The forward end of the cutting member may be somewhat inclined forwardly from its top to its bottom portion, being thus disposed at an acute angle to a line passing axially through the bar or body member. The front end of the cutting member 5 is flat as at 6, whereby two cutting edges are provided, as indicated at 7, 7. The cutting end of the cutting member 5 may have a width of, say one-eigth of an inch, but it is evident that it may be wider or narrower, according to the width it may be desired to cut a slit in the steel or between two steel sheets.

In operation, the finger 3 will ride over the sheet or adjacent sheets to be subsequently welded, no matter how irregular the same may be and the cutting member will be prevented, by said finger from projecting too far through the slit to become wedged. The cutting member is comparatively short and hence the tool may be accurately operated to cut in curved as well as straight lines so that it may form rounded corners at the ends of a patch or at the ends of an opening in a sheet to receive a patch. When adjacent edges to be welded are too close properly to receive a welding alloy so that the latter may extend from one face to the other of the adjacent metal parts, my improved tool is useful to cut away such parts of the adjacent edge portions as to provide a proper space between them to receive the welding alloy and thus insure an effective weld between such adjacent edge portions to be welded together, and the said tool may also be used accurately to cut a patch from a sheet of steel.

Having fully described my invention, what I claim as new and desire to secure by Letters-Patent is:—

1. A metal working tool of the character described, comprising a body member provided at one end with an upwardly and forwardly projecting finger, and a cutting member at the forward end of said body member, said cutting member having two cutting edges spaced apart at its forward end.

2. A metal working tool of the character described, comprising a body member, a cutting member at the forward end of said body member, said cutting member having a flat inclined forward end forming two cutting edges spaced apart, and a finger projecting from the forward end of the body member above and forwardly beyond said cutting member.

3. A metal working tool of the character described, comprising a body member, a cutting member at the forward end of said body member and having two cutting edges spaced apart at its forward end, and a finger projecting forwardly from the forward end of said body member, said finger having an underface curved longitudinally and transversely.

In testimony whereof, I have signed this specification in the presence of two subscribing witnesses.

WILLIAM P. CARROLL.

Witnesses:
CLIFFORD C. MARSHALL,
ANNA MARSHALL.